March 30, 1937. L. W. CHUBB 2,075,094
SIGNALING SYSTEM
Filed July 26, 1933 3 Sheets-Sheet 3
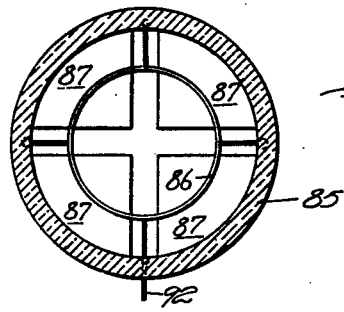
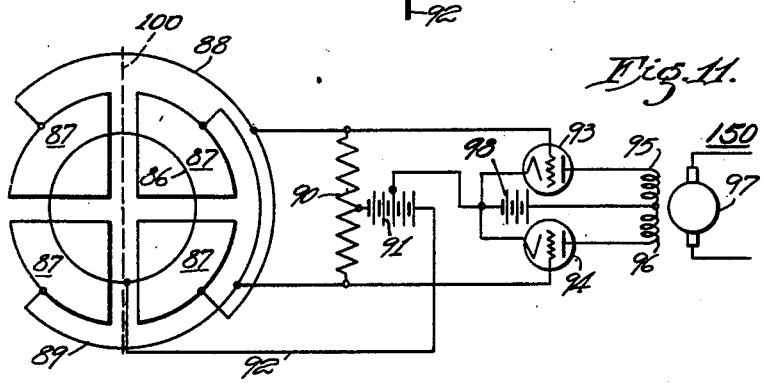
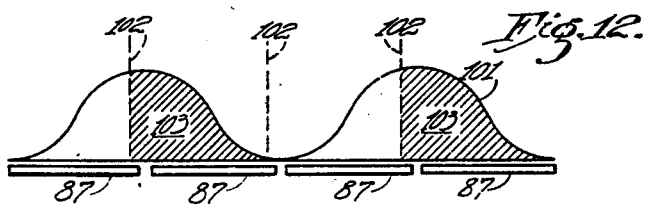
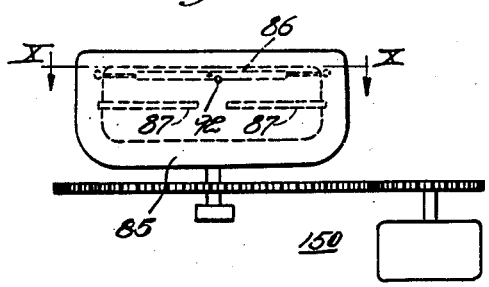
WITNESSES.
E.C. Leiding.
Nm. C. Groove
INVENTOR
Lewis W. Chubb.
BY F.W.Lyle.
ATTORNEY Patented Mar. 30, 1937

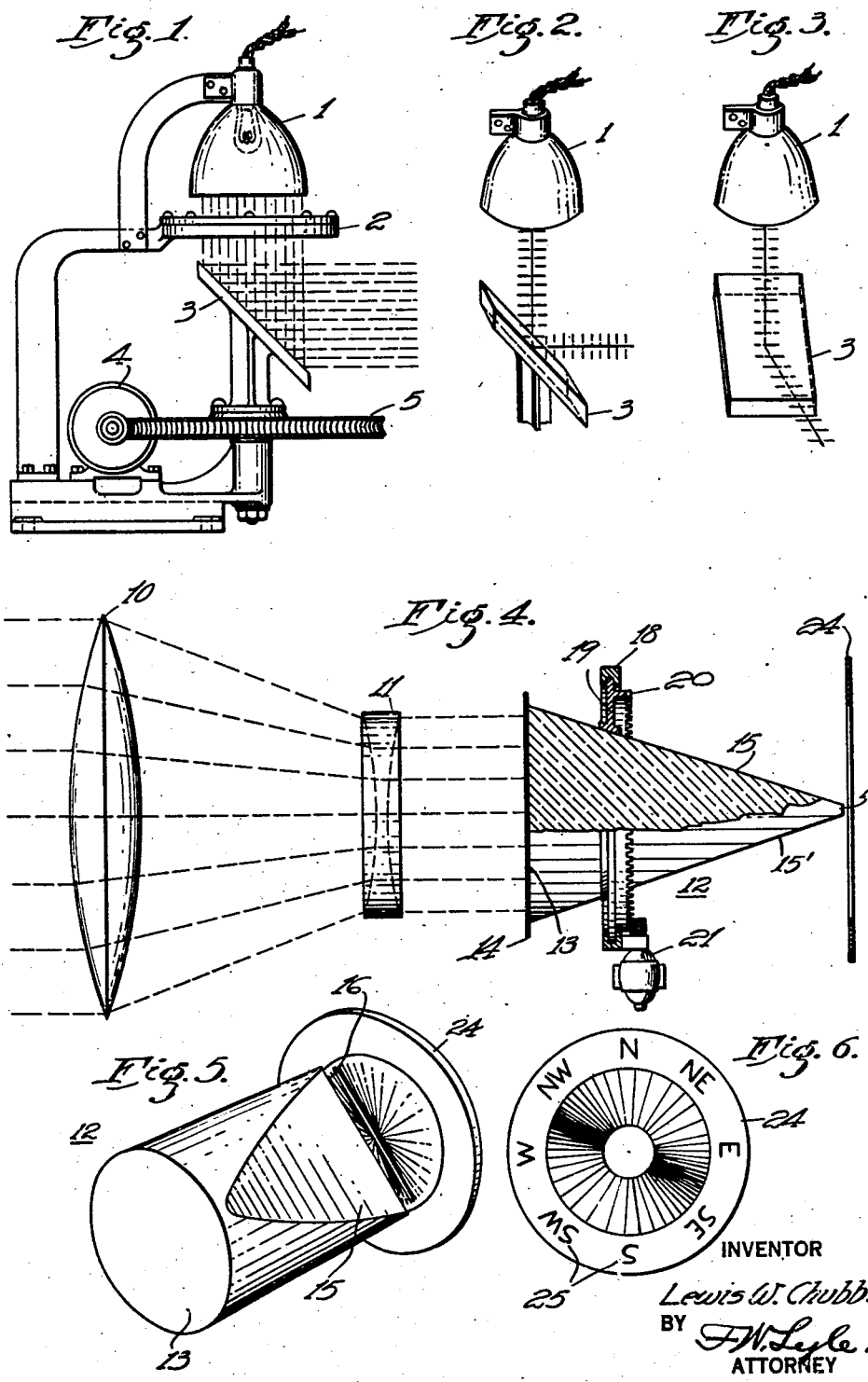

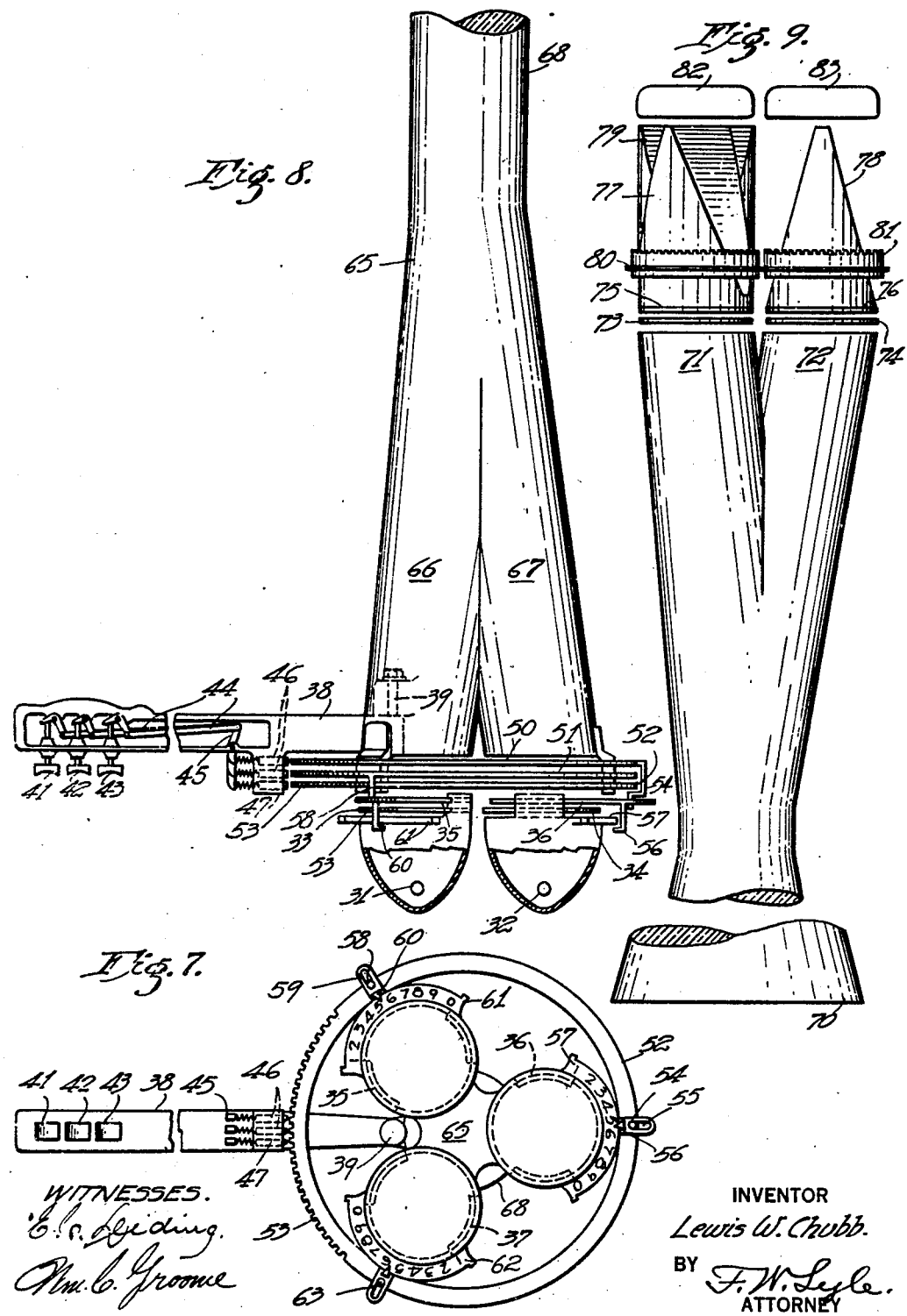

2,075,094

UNITED STATES PATENT OFFICE 2,075,094

SIGNALING SYSTEM

Lewis W. Chubb, Pittsburgh, Pa., assignor to Westinghouse Electric & Manufacturing Company, East Pittsburgh, Pa., a corporation of Pennsylvania Application July 26, 1933, Serial No. 682,281

18 Claims. (Cl. 250—41.5)

This invention relates to signaling and particularly to means for producing signals at a distance by a beam of light.

It is an object of this invention to afford a means of communication over a beam of light which will involve no change in the light which can be observed without the use of special instruments. In this way secret signaling can be accomplished, particularly if the light used is not visible light.

It is a further object of this invention to use the plane of polarization of plane-polarized light as a means of conveying intelligence.

It is a further object of my invention to so associate a polarizer at the sending station and an analyzer at the receiving station that the position of the plane of polarization is at all times indicated at the receiving station.

It is a further object of my invention to provide a means for rotating the plane of polarization of polarized light in a convenient and efficient way, whereby such rotation may be used for signaling purposes.

It is a further object of my invention to provide a continuous indication of the position of the plane of polarization of a beam of polarized light without requiring an attendant at the receiving station to manipulate any instrument to discover said position.

It is a further object of my invention to provide a photocell so correlated with the illumination from the above described system that changes in the position of the plane of polarization will be indicated in the output of the photocell.

It is a further object of my invention to provide a continuously rotating analyzer moving so rapidly that persistence of vision will enable the observer to recognize the direction corresponding to the plane of polarization.

It is a further object of my invention to produce a plurality of beams of light differing from one another in color or other permanent characteristic and each individually polarized in a plane which can be rotated at will in accordance with the respective signal to be sent.

It is a further object of my invention to produce an illumination which is crossed by a band of a different degree of illumination and to associate indicia or other translating means therewith, whereby rotation of the band may be interpreted as changing the significance of the signal.

Other objects of my invention and details of the structure proposed will be understood from the following description and the accompanying drawings in which:

Figure 1 is an elevational view of one form of the sending device.

Figs. 2 and 3 are diagrammatic views indicating the operation of the apparatus at two different positions.

Fig. 4 is a diagrammatic view of the receiving apparatus partly in side elevation and partly in section.

Fig. 5 is a perspective view of certain details of the receiving apparatus.

Fig. 6 is a plan view of the translating means.

Fig. 7 is a bottom end view of a portion of a sending apparatus intended for a plurality of simultaneous indications.

Fig. 8 is a side elevational view of a larger portion of said apparatus.

Fig. 9 is a side elevational view of the corresponding receiving apparatus.

Fig. 10 is a section of a photocell of the kind shown in Fig. 9, the section being on the line X—X of Fig. 13.

Fig. 11 is a diagram of the circuits used in connection with said photocell.

Fig. 12 is a curve to which reference will be made in explaining the action of the photocell, and Fig. 13 is a side elevational view of the photocell.

In Fig. 1 a lamp 1 is shown as representative of any source of light. This may be the light in a lighthouse or a supplemental light at a lighthouse used for this signaling or it may be a beacon independent of any other signaling system, if desired. Below it, supported in a frame 2 is a sheet of material which will polarize the light passing through it, tourmaline, Iceland spar herapathite, or any similar material may be used.

The light from the source 1 is received upon a metal mirror 3 which is mounted for rotation about a vertical axis. A motor 4 is provided to drive the rotating mirror, through reduction gearing including a worm wheel 5. The light from the source 1 is reflected by the mirror 3 into a horizontal beam of light which, at times during the rotation, impinges upon receiving devices, one of which is represented in Fig. 4.

The receiving device includes a lens 10 for concentrating the light and a lens 11 for bringing it into a parallel beam, which enters the transparent body 12 through the flat circular face 13 thereof. A sheet 14 of herapathite, tourmaline or similar material is affixed to the surface 13 and acts as an analyzer of the polarized light. The shape of the body 12 is a cylinder cut by two oblique planes, one of which 15, is shown in Fig. 5 and is shown in edge view in Fig. 4. The other oblique plane is shown in edge view at 15' in Fig. 4. The two planes meet or come very near to each other at an edge 16.

The body 12 may be of quartz or of any transparent material having a high index of refraction. It is intended that light received through the face 13 should be reflected internally by complete reflection each time that it reaches the surface, except when its incidence is nearly normal. When the incidence is nearly normal, the light will pass through the surface. Light therefore will emerge at the edge 16. Fused quartz is suitable for such internal reflection, but other highly refractive materials may be used. It is also possible to use a hollow metal body, but the reflections from the inner surface of the metal will be less complete than the internal reflections just described.

The body 12 is mounted in a circular support 18 by means of flanges 19 which extend to the flat faces 15 and 15'. The frame 18 is provided with a crown gear 20 which meshes with a pinion driven by a motor 21. Adjacent the edge 16, at which the light emerges, a ring 24 is provided, on one face of which, as shown in Fig. 6, indicia are depicted. As shown in Fig. 4, the ring 24 is annular, but if desired, the central portion thereof may be filled with translucent material or a sheet of translucent material may be attached to the ring 24 and cover the central portion thereof.

When the translucent material is not used, the observer looks directly at the brilliant edge 16, which, being in motion, emits a field of light and appears like an illuminated surface, the illumination being distributed as explained below. When the translucent material is used, it should be as close to the edge 16 of the body 12 as possible to preserve the sharpness of the pattern in the distribution of illumination.

The indicia need not be compass-direction signs as illustrated in Fig. 6, but any sort of characters with any assigned meaning may be used.

In the operation of the system just described the apparatus shown in Fig. 1 is mounted in a lighthouse, or at an air port, or at any other point where regular or frequent sending of signals indicative of direction is desirable. The light from the light source 1, passing through the polarizer in the frame 2, becomes plane-polarized light which is reflected from the mirror 3 and thrown out as a horizontal beam.

As the mirror 3 is rotated by the motor 4, the compass-direction of the horizontal beam changes progressively. The beam produced by the act of reflecting the plane polarized light is also a beam of polarized light and as the mirror 3 rotates the plane of polarization in the horizontal beam will also rotate about that beam as an axis. This beam will be polarized in a vertical plane for one position of the mirror 3, in a horizontal plane for a position of the mirror 90° from the first, in a vertical plane again for a position of the mirror 180° from the first position, etc.

Thus, as the horizontal beam takes different azimuths, in the geographical sense, it is polarized in different azimuths, in the sense in which "azimuth" is used in optics. This rotation of the plane of polarization of the horizontal beam is a consequence of the polarized character of the light from the frame 2. It can also be called a consequence of the mirror 3 being of metal, although the same polarization in a much smaller degree may be observed with a non-metallic mirror.

At the receiving station, the light is caught by the lens 10 and concentrated upon the lens 11 where it is made parallel and enters the body 12 normally to the face 13. Within the body 12 the light is totally reflected because, whenever it becomes incident upon the surface, the angle of incidents is larger than the critical angle, and, after repeated reflections if necessary, it arrives at the edge 16 normally or nearly normally to the surface there. The light emerges from the edge 16 but will not emerge through the cylindrical surface or through the flat surfaces 15 and 15'.

The sheet 14 rotates with the body 12. When this sheet, acting as an analyzer, is in the position of optical coincidence with the plane of polarization of the arriving light, it permits the passage of light most effectively, but when it is in a position at right angles thereto, it will cut off the light. If the sheet is of sufficient thickness, this cutting off of the light at a particular position is complete, although in a position at right angles thereto, the sheet offers but little obstruction to the passage of light.

There will be, therefore, a position of the body 12 and the screen 14 in which little or no light will emerge from the edge 16. When the body 12 and analyzer 14 are in a position at right angles to this, a maximum amount of light will emerge from the edge 16.

The rotation of the body 12 and the analyzer is at such a speed that the edge 16 returns to any given position before the visual impression, created when it was formerly in that position, has faded. In other words, the speed of rotation is greater than the persistence of vision. It is a consequence of these actions that there appears to be a bright area in the central part of the ring 24, but the light in this area is not uniform. Instead, there will be one direction across it where little or no light from the edge 16 is received and another band at right angles thereto at which the received light is a maximum.

If the observer looks at the ring 24 from the side opposite the body 12 he will see this distribution of light in the open space at the middle of the ring. If the field of light delivered by the rotating edge 16 is crossed by a material surface, the illumination of the surface is distributed in accordance with the distribution of light in the field and can be observed, through the surface if translucent or from the side toward the body 12 if opaque. The observer may thus select the part of ring 24 indicated on either core but always the surface must be close or convenient to the edge 16 for accuracy.

The change with its rotation of light transmitted through the analyzer is indicated by the curve in Fig. 12, in which the ordinates represent light intensity and the abscissae the degree of rotation. Places, like that represented at the middle of Fig. 12, where the illumination falls to zero or becomes very small, will appear very black to the observer, and afford much greater contrast with the adjacent regions than will be afforded by the places corresponding to the highest point of this curve. The dark line across the illuminated area will, therefore, be more sharply marked than the line of greatest illumination. For this reason the dark line will serve better as a pointer and the indicia placed upon the ring 24 cooperate with this dark line to give to the observer the information intended.

In the application of the invention chosen for illustration, the information conveyed is the direction of the lighthouse or other sending station from the receiving apparatus. Thus in the situation illustrated in Fig. 6 the sending station is west—north—west from the receiving station. The same position of the pointer could very well mean that the sending station is east—south—east from the receiving station. The operator receiving the signal usually knows enough about his position from other sources of information to distinguish properly between the two possible meanings. Ships approaching a harbor entrance or airplanes approaching a landing field ordinarily know approximately their direction of approach but desire some such signal as is here proposed to learn the exact bearing.

If desired, the polarizer instead of being located in the frame 2, Fig. 1, may be located in the path of the horizontal beam and rotated by suitable gearing, meshing for example with worm wheel 5, whereby any one position of the mirror 3 is associated with a definite position of the polarizer. In addition there may be, if desired, provision for moving the polarizer in accordance with any desired code regardless of the position of the mirror 3.

The construction illustrated in Figs. 7 and 8, shows means by which a plurality of beams of light, each polarized in a plane, may be simultaneously controlled, the direction of the plane of polarization being selected at will for each of the beams.

Three separate sources of light, two of which are shown in Fig. 8 at 31 and 32 are provided for supplying the three beams of light. Each light source is surrounded by a parabolic mirror. Associated with each light source is a color screen. Two of these screens are shown at 33 and 34 respectively in Fig. 8; the third one, being behind screen 33, does not show, each light source also has associated with it a sheet of polarizing material. Two of these, 35 and 36, appear in Figs. 7 and 8, the third one, 37, appearing only in Fig. 7.

Means are provided for rotating the three polarizers 35, 36 and 37 at will. In the form illustrated, the common driving means is a manually operated handle 38 mounted upon a pivot 39 as close to the center of the assembly of light sources and polarizers as can be conveniently managed. The lever 38 is equipped with three finger pieces 41, 42 and 43, each equipped with a plunger to operate a bell crank lever, three of which are shown in Fig. 8. Each of these bell-crank levers is connected to a link, the link 44, associated with the finger piece 43, being most clearly shown in Fig. 8. Each link is connected to a lever, one of which, 45, is clearly shown in Fig. 8 and all three of which are shown in end view in Fig. 7.

The three levers, like 45, operate three plungers; the plunger 46 being associated with the lever 45, as is most clearly shown in Fig. 8. A boss 47 on the arm 38 affords each plunger a mounting, in which it may slide. One face of the boss acts as a seat against which springs, one for each plunger, bear; the other ends of the springs bearing on the respective levers, like 45. The springs bias the parts toward the illustrated positions, in which the plungers, like 46, are toward the left and the fingerpieces are spaced away from the handle 38.

Three rings 50, 51 and 52 are mounted to revolve about the center of the assembly of light sources and polarizers. Each of these rings is provided with a toothed section, extending over somewhat more than 90°, best shown at 53 in Fig. 7. The three rings are so positioned that their respective toothed sections are opposite the three plungers, like 46.

Each of the rings is provided with a depending finger. The finger 54, integral with the ring 50, is shaped to extend around the edges of the other rings and extends into a slotted lug 55 upon the frame of the analyzer 36. A pointer 56 extends from this lug into juxtaposition with a scale 57 mounted upon the housing of the light source 32.

A similar finger 58 on the ring 51 extends into a slot 59 on a lug associated with the polarizer 35 and is equipped with a pointer 60 to cooperate with a scale 61 upon the housing of the light source 31. Each of the scales, 57, 61 and the scale 62, associated with the light source not shown in Fig. 8, is equipped at each end with a stop which cooperates with the pointer to prevent rotation of the polarizer beyond a useful amount. The ring 52 has a similar finger shown at 63 in Fig. 7 for cooperating with the analyzer 37.

The three light beams from the three light sources are caused to unite into a single light beam by a body 65 of fused quartz or similar material having at one end a three-part division into cylindrical portions, two of which 66 and 67, show in Fig. 8. The end surfaces of the three portions lie opposite the three respective light sources and have flat ends, whereby the light from the three sources may enter the three cylindrical portions. These cylindrical portions merge into a main delivery portion 68 and emerge at the further end thereof through a similar flat end surface. If preferred, the merging of the three light beams may be accomplished by hollow metallic reflecting members.

The receiving apparatus to be used with the sending apparatus shown in Figs. 7 and 8 includes an optical concentrating device, shown in Fig. 9, the larger end of which is shown at 70 and the smaller end of which divides into three cylindrical portions, two of which are shown at 71 and 72. This concentrating device may be of fused quartz or the like or may be a hollow metallic reflecting body.

Opposite the ends 71, 72 and the third end, not shown in the drawings, are located color screens 73, 74 and one not shown, which are of the same color as the screens 33, 34 and the one not shown in Fig. 8. Opposite each color screen is an analyzer, 75, 76 and one not shown, which are of polarizing material such as herapathite. The three analyzers are preferably attached respectively to three quartz bodies shaped like the body 12 in Figs. 4 and 5. These bodies are shown at 77, 78 and 79. Each is mounted in a ring equipped with a crown gear, two of which show at 80 and 81, but the third does not show in Fig. 9.

The three edges of these bodies are illustrated as occupying different angular positions in a plane parallel to the end surface 70. The three optical bodies together with their analyzers are intended to be continuously rotated. This may be done by any suitable common driving means meshing with the three crown gears, two of which are illustrated on the rings 80 and 81.

Opposite each of the three rotating quartz bodies is a photocell, two of which are shown at 82 and 83. One of these photocells is illustrated in detail in Figs. 10, 11, and 13. Each photocell comprises an envelope 85 within which is mounted a collector 86. As shown, this collector or anode is a ring, but it may very well be a knob, which is preferably located at the center of the circle in which the ring 86 is shown.

There are four sheets 87 of metal coated with photo-electric material mounted in the photocell. Each sheet 87 is quadrant shaped, the points being toward one another and the four are symmetrically arranged about the center of the photocell. Two diagonally-opposite quadrants 87 are connected by a conductor 88 as shown in Fig. 11 and the other two by a conductor 89.

The conductors 88 and 89 are respectively connected to opposite ends of a resistor 90. The central point of this resistor is connected to the negative end of a battery 91, the positive end of which is connected to the anode through a lead shown at 92. The midpoint of the battery 91 is connected to the cathodes of two vacuum tubes diagrammatically illustrated at 93 and 94. The grids of the tubes are connected respectively to the two ends of the resistor 90 and the plates are connected to two different field-windings 95 and 96 which cooperate with the rotor 97 of a motor 150. The junction of the two fields is connected to the positive terminal of a B-battery 98. The negative terminal of this battery like the midpoint of the battery 91 is connected to the cathodes of the tubes.

The operator at the sending station shown in Figs. 7 and 8 manipulates the three polarizers 35, 36 and 37 by means of the handle 38. To do this he grasps the handle, depressing as he grasps it one or more of the finger pieces 41, 42 and 43, depending upon which of the polarizers he intends to move. The plungers like 46 connected to the depressed finger piece move into engagement with the toothed section on the corresponding rings like 52. Then the operator moves the handle 38 and the rings which have been clutched thereto are moved. The springs acting on the plungers like 46 accommodate them to the eccentric mounting of handle 38 relative to the rings like 50. The rings which are moved, move the corresponding analyzers through fingers like 54 and slotted lugs like 55. Pointers like 56 are moved at the same time and enable the operator, by observing the position of the pointers, relative to the scales like 57 to know in what position he has placed each of the polarizers. The stops at the ends of the scales prevent rotation of any one polarizer through much more than an angle of 90°. Useless movement of the polarizers and confusion between two equivalent positions thereof is thereby avoided.

Light from the three sources, 31, 32 and the one not shown, produces three beams of colored light. Preferably the colors are so chosen that, when combined, they will produce white light. Red, green and yellow might, for example, be the colors chosen for the three color screens. In each beam the colored light passes through a polarizer and, therefore, enters the cylindrical part, 66, 67 or the one not represented in Fig. 8, as plane polarized light.

The three beams are polarized in planes which have an arbitrary relation to one another, the planes having been fixed by the action of the operator in rotating the polarizers 35, 36 and 37 in accordance with the signal he wishes to convey. The three beams coalesce by the merging action of the optical body 65 and emerge from the single end of this body as a beam of white light.

No person unacquainted with the way in which this beam is produced could discover by observing the appearance of the beam either that it contained signals or how the signals were conveyed, and no one without a receiving device designed for this purpose could interpret the signals.

The receiving device is illustrated in Fig. 9. Light from the sending station impinges on the flat end 79 of the quartz body and is divided into three beams by the action of this body. Each beam is received upon a color screen 73, 74 and one not represented. Only light of the color corresponding to the screens 33, 34 and the one in Fig. 8 not represented, will emerge from the color screens at the receiving station. The light is thus divided at the receiving station into three colored parts, each of which is polarized in a plane fixed by the polarizer associated with the color screen of the same color at the sending station.

The three rotating wedge-shaped bodies 77, 78 and 79 produce three circular fields of light in the way described in connection with the one wedge-shaped body and the one illuminated field shown in Figs. 4, 5 and 6. The three illuminated fields will be of three different colors. The black line crossing any one of these fields will be in a position fixed by the operator at the sending station when he positioned the corresponding polarizer 35, 36 or 37.

The operator at the sending station is, therefore, able to produce at the receiving station three signals, each indicated by the position of a black line on an illuminated field. By suitably chosen combinations of these three indications a very complete and elaborate communication system is possible.

Instead of requiring the observer to watch the position of the black lines at the receiving station, the photocells, 82, 83 and one not shown in Fig. 9, are employed. They may be each associated with a circuit like that illustrated in Fig. 11. If the black line be in the position illustrated at 100 in Fig. 11, the light will be equally distributed along the two sides of this line and consequently equally divided between the two pairs of cathodes. The current through one pair of cathodes will then be equal to the current through the other pair and there will be no potential difference between the two ends of the resistor 90. There will, therefore, be no tendency to rotate the armature 97.

If the polarizer at the sending station is rotated away from the position corresponding to the position of the black line 100 just discussed, the black line will rotate. One pair of cathodes will then be illuminated more than the other pair. There will, therefore, be a different current through one-half of the resistor 90 from that through the other half. Consequently, the grid of one tube will be at a different potential from that of the other, and the current in one field, 95, will differ from the current in the other field, 96. There will then be a tendency for the armature 97 to rotate. The direction of rotation will be dependent upon the direction in which the black line 100 rotated.

This may become clearer by considering Fig. 12, wherein the plates 87 are shown in a developed relation and the curve 101 is located with the crests opposite the gaps between two plates and the troughs opposite the other gaps. If the illumination of the plates is rotated, the effect upon its relation to the plates 87 can be shown by indicating different positions for these gaps, which has been done in Fig. 12 by dotted lines 102. These indicate the position of the gaps relative to the curve when the curve has moved to the right. The curve 101 is related to the lines 102 in a way to show the relation of the illumination to the gaps between the cathode 87 when the dark line 100 has been rotated through a small angle.

It will be apparent from a study of these lines that the left-hand plate 87 now receives less light than before and that the third plate 87 from the left also receives less light than before. The shaded areas 103 indicate this diminution. They also show the amount of light added to the second plate 87 from the left and to the right-hand plate 87. There is a diminution in the light on these last-mentioned plates represented by areas too small to be shaded between lines 102 and the gaps. There is also an addition to the light on left-hand plate 87 and on the third plate 87 from the left represented by the same small areas. The changes in illumination of the plates 87 occurring at the troughs of the curve are small compared with the changes represented by the shaded areas. The result, therefore, is that one pair of plates 87 now receive less light and the other pair receive more light.

The rotation of the armature 97 will now occur and may be employed to move a pointer which the attendant at the receiving station might be required to observe. It may likewise be employed to move a record making device so that a written record of the signal could be made at the receiving station. It might also be employed to rotate the photocell itself as is illustrated in Fig. 13 and thereby maintain it in a position where the black line crosses it between two cathodes.

With the latter operation, the armature 97 would be energized only when the attendant at the sending station is in the act of moving the polarizers. It would, therefore, be possible to set up a permanent indication at the receiving station of the position selected at the sending station, even when the light sources are extinguished soon after the positions were established.

If the light from the optical body 65 is too scattering to convey a signal to any great distance, a more parallel beam can be obtained by tapering the end 68 to a small end surface or a point and locating it at the focus of a beam-forming optical system, for example, a parabolic mirror or a lens.

Although the description has been written in terms of visible light, it will be apparent to those skilled in the art that infra red or ultra violet light could be employed effectively. The beam of light would then be unobserved by persons not concerned in the sending or receiving of signals and the signaling can thus be made completely secret.

If, on the other hand, visible light should be employed, it would appear to those not acquainted with the transactions that it was a steady beam of white light and they would have no means of knowing when it was merely a beacon light and when it was communicating signals. No indication of the action of signaling would be apparent to any one except an observer equipped with the receiving apparatus described herein.

When used to convey signals to an airplane, the means for moving the several polarizers may advantageously include a lever resembling the control stick of the airplane. Suitable gearing may be used to move the three polarizers in accordance with the three components of the motion of the stick and three motors like the armature 97 of Fig. 11 may move a pointer or pointers on the airplane or may move the controls themselves of the airplane without the intervention of a pilot.

Although colors are discussed in connection with Figs. 7 to 9, it is not intended to indicate that monochromatic light is necessary in Figs. 1 to 6. If white light is used, the color fingers produced are too small to interfere with the designation of proper signals.

Many other modifications in details and many modifications of the system proposed will occur to those skilled in the art. The specific illustration and description are only a few of the possible forms of this invention. It is not to be construed as a limitation.

I claim as my invention:

1. In an optical signaling system, a light source, means for producing a beam of plane polarized light therefrom, means for rotating the plane of polarization of said beam, while preserving the character of the light as plane polarized light, in accordance with the signal to be sent, a continuously rotating analyzer in the path of said beam and means cooperating with said analyzer to indicate the signal.

2. In an optical signaling system for transmitting and receiving correlated signals, a light source, means for producing therefrom a plurality of beams of polarized light of mutually distinguishing characteristics to correspond to each of said signals, means for separately rotating the plane of polarization of each of said beams in accordance with the respective signals, continuously rotating analyzers, one for each beam, and means cooperating with each analyzer to indicate the respective signals.

3. In an optical signaling system for transmitting and receiving correlated signals, one or more light sources, means for producing therefrom a plurality of beams of polarized light each beam being of a different color to correspond to each of said signals, means for separately rotating the plane of polarization of each beam in accordance with the several signals to be conveyed thereby, continuously rotating analyzers one for each beam, color screens for shielding each analyzer from all but its respective beam and means cooperating with said analyzers for indicating the signals conveyed by the respective beams.

4. In an optical signaling system for transmitting and receiving correlated signals, one or more light sources, means for producing therefrom a plurality of beams of polarized light each beam being of a different color to correspond to each of said signals, means for selecting any number of said beams and rotating the plane of polarization of each of the selected beams through individually determined angles in accordance with the several signals to be conveyed thereby, continuously rotating analyzers, one for each beam, color screens for shielding each analyzer from all but its respective beam and means cooperating with said analyzers for indicating the signals conveyed by the respective beams.

5. In combination, an analyzer for polarized light, a light-concentrating device positioned to receive light from said analyzer, said device having a substantially linear light-delivery surface, means for rotating said analyzer and device at a speed above the persistence of vision and a reference scale cooperating with the delivered light to indicate the azimuth of the polarization.

6. In combination, an analyzer for polarized light, a light-concentrating device positioned to receive light from said analyzer, said device having a substantially linear light-delivery surface, means for rotating said analyzer and device at a speed above the persistence of vision, a screen receiving light from said device, and an indicating scale adjacent said screen.

7. In a receiving device for polarized light, an analyzer, optical means for concentrating the light from said analyzer into a line, means for rotating said analyzer and optical means together about an axis approximately parallel to the path of the light in the analyzer, whereby a field of illumination of an intensity varying with the phase of said rotation is produced.

8. In a receiving device for polarized light, an analyzer, optical means for concentrating the light delivered by the analyzer into a beam of approximately linear cross section, means for rotating said analyzer, whereby the light delivered therefrom will vary in intensity, said means also rotating said optical means to cause said beam of concentrated light to rotate synchronously with said variation in intensity, means cooperating with the light in said beam to produce indications from the change in the distribution thereof.

9. In combination, means for sending light polarized in a selected plane, an analyzer in position to receive light from said means, means cooperating with said analyzer to produce a field-distribution of illumination the intensity distribution in space of which is correlated to the selection of the plane of polarization and translating means for giving significance to said distribution.

10. In combination, means for sending light polarized in a selected plane, an analyzer in position to receive light from said means, means cooperating with said analyzer to produce a surface-distribution of illumination the intensity distribution in space of which is correlated to the selection of the plane of polarization and a photocell having light-sensitive elements so positioned relative to said illumination that changes in said distribution will alter the output of said photocell.

11. In combination, means for sending light polarized in a selected plane, an analyzer in position to receive light from said means, means cooperating with said analyzer to produce a field-distribution of light correlated to the selection of the plane of polarization, a movable object and means responsive to changes in said distribution for moving said object into a position corresponding to the selected plane.

12. In a light-translating system, a photo-responsive device having light-sensitive elements symmetrically arranged in pairs, unitary means responsive to the distribution of illumination over said elements for indicating when the illumination of one symmetrically situated pair of elements differs from the illumination of another such pair.

13. In a light-translating system, a photo-responsive device having light-sensitive elements symmetrically arranged in pairs, means responsive to the distribution of illumination over said elements for indicating when the illumination of one symmetrically situated pair of elements differs from the illumination of another such pair, means controlled by said response for moving the photo-responsive device about the center of said symmetry, the sense of said movement being determined by the sense of said difference of illumination.

14. In combination with a means for producing a distribution of illumination symmetrical about an axis of symmetry, a photo-responsive device having light-sensitive elements symmetrically arranged about a center of symmetry in said axis of symmetry means controlled by any difference in the total illumination of the elements on one side of said axis from the total illumination of those on the other side for so rotating the photo-responsive devices that equality of said totals will be restored, whereby rotation of the distribution of illumination will be initiated by rotation of the photo-responsive device.

15. In a receiving device for polarized light, an analyzer, optical means for concentrating the light delivered by the analyzer into a beam of approximately linear cross section, means for rotating said analyzer, whereby the light delivered therefrom will vary in intensity, said means also rotating said optical means to cause said beam of concentrated light to rotate synchronously with said variation in intensity, a light-receiving surface in position to be illuminated by said rotating beam and means cooperating with said illuminated surface to produce indications from changes in distribution of the illumination thereon.

16. In a system for indicating the position of an element, means for producing a beam of polarized radiations, means for so swinging said beam that it generates a surface including the region in which said element lies and simultaneously rotating the plane of polarization of said radiations in such manner that the angular position of said beam is a function of the angle of rotation of the plane of polarization and means associated with said element and responsive to said beam in accordance with its plane of polarization for indicating the angular position of said beam.

17. In a system for indicating the position of an element, means for producing a beam of polarized radiations, means for so swinging said beam that it generates a surface including the region in which said element lies and simultaneously rotating the plane of polarization of said radiations in such manner that the angular position of said beam is a function of the angle of rotation of the plane of polarization, means including a continuously rotating optical analyzer disposed in the path of said beam and means for indicating the plane of polarization of the beam transmitted through said analyzer for indicating the angular position of said beam.

18. In a system for indicating the position of an element, means for producing a beam of polarized radiations, means for so swinging said beam that it generates a surface including the region in which said element lies and simultaneously rotating the plane of polarization of said radiations in such manner that the angular position of said beam is a function of the angle of rotation of the plane of polarization and means associated with said element for indicating the plane of polarization of said beam.

LEWIS W. CHUBB.